(12) United States Patent
Wang et al.

(10) Patent No.: US 10,586,352 B2
(45) Date of Patent: Mar. 10, 2020

(54) CAMERA CALIBRATION

(71) Applicant: Anhui Huami Information Technology Co., Ltd., Hefei, Anhui (CN)

(72) Inventors: Kongqiao Wang, Anhui (CN); Wei Zhao, Anhui (CN)

(73) Assignee: Anhui Huami Information Technology Co., Ltd., Hefei, Anhui (CN)

( * ) Notice: Subject to any disclaimer, the term of this patent is extended or adjusted under 35 U.S.C. 154(b) by 112 days.

(21) Appl. No.: 16/034,083

(22) Filed: Jul. 12, 2018

(65) Prior Publication Data
US 2018/0322658 A1 Nov. 8, 2018

Related U.S. Application Data

(63) Continuation-in-part of application No. PCT/CN2018/077341, filed on Feb. 27, 2018.

(30) Foreign Application Priority Data

Feb. 27, 2017 (CN) .......................... 2017 1 0108686

(51) Int. Cl.
*G06T 7/80* (2017.01)
*H04N 13/246* (2018.01)
*H04N 13/239* (2018.01)

(52) U.S. Cl.
CPC .............. *G06T 7/85* (2017.01); *H04N 13/239* (2018.05); *H04N 13/246* (2018.05); *G06T 2207/10012* (2013.01)

(58) Field of Classification Search
CPC .............. G06T 7/85; G06T 2207/10012; G06T 2207/10004; H04N 13/246; H04N 13/239

USPC .......................................................... 382/154
See application file for complete search history.

(56) References Cited

U.S. PATENT DOCUMENTS

2008/0181488 A1* 7/2008 Ishii ........................ B60R 1/00
382/154

FOREIGN PATENT DOCUMENTS

CN    105678740 A * 6/2016 ............... G06T 7/00
JP    2010-513907 A * 12/2007

* cited by examiner

*Primary Examiner* — Amandeep Saini
(74) *Attorney, Agent, or Firm* — Young Basile Hanlon & MacFarlane, P.C.

(57) ABSTRACT

A camera calibration method includes: based on external parameters of the first camera, determining a first mapping point set on a reference mapping plane for a first feature point set on an original image captured by the first camera; based on M predetermined adjustment modes, adjusting external parameter values of the second camera to obtain M intermediate extremal parameter values; based on each adjustment mode and its corresponding external parameter values, determining a second mapping point set on the reference mapping plane for a second feature point set that matches with the first feature point set and is on an original image captured by the second camera; computing a distance corresponding to the adjustment mode between the second mapping point set and the first mapping point set; and adjusting the external parameter values of the second camera based on the distance and a step length corresponding to each adjustment mode.

20 Claims, 8 Drawing Sheets

CAMERA CALIBRATION

CROSS-REFERENCE TO RELATED APPLICATION(S)

This application is a continuation-in-part of International Application No. PCT/CN2018/077341, filed on Feb. 27, 2018, which claims priority to Chinese Patent Application No. 201710108686.X, filed on Feb. 27, 2017, the contents of both of which are hereby incorporated by reference in their entireties.

TECHNICAL FIELD

This disclosure relates to computer vision, in particular, to methods, apparatuses, and electronic devices for camera calibration.

BACKGROUND

In computer vision, to obtain an ideal three-dimensional (3D) effect, relative positions between the cameras need to be determined. For example, a binocular stereo camera (referred to as a "binocular camera" for simplicity) or a multi-stereo camera (referred to as a "multi-camera" for simplicity) can be used to simultaneously photograph a standard calibration plate (e.g., a standard grid plate) for multiple times. To collect sufficient sample images, the posture and position of the calibration plate can be changed as much as possible. Therefore, this kind of calibration method might take a long time.

SUMMARY

Disclosed herein are methods and apparatuses for camera calibration.

In an aspect, a method for camera calibration is disclosed. The method includes determining a first feature point set of a first original image captured by a first camera and a second feature point set of a second original image captured by a second camera, wherein the first feature point set corresponds to the second feature point set; determining, based on first external parameter values used by the first camera, a first mapping point set by mapping the first feature point set to a reference mapping plane; determining, based on M predetermined adjustment modes, M groups of intermediate external parameter values by adjusting second external parameter values used by the second camera, wherein M is an integer greater than or equal to 2, and each of the M predetermined adjustment modes comprises a predetermined step length; determining, for each adjustment mode of the M predetermined adjustment modes, a second mapping point set corresponding to the adjustment mode by mapping the second feature point set to the reference mapping plane based on a group of intermediate external parameter values, wherein the group of intermediate external parameter values is one of the M groups of intermediate external parameter values and is determined based on the adjustment mode; determining a distance between the first mapping point set and the second mapping point set as a distance corresponding to the adjustment mode; adjusting, based on the distance and the predetermined step length, the second external parameter values; completing calibration of the second external parameter values based on a determination that distances corresponding to the respective M predetermined adjustment modes meet an iteration termination condition; and returning to the determining the M groups of intermediate external parameter values based on a determination that the distances corresponding to the respective M predetermined adjustment modes do not meet the iteration termination condition.

In another aspect, an apparatus for camera calibration is disclosed. The apparatus includes a processor and a memory. The memory is coupled to the processor and configured to store instructions which when executed by the processor become operational with the processor to: determine a first feature point set of a first original image captured by a first camera and a second feature point set of a second original image captured by a second camera, wherein the first feature point set corresponds to the second feature point set; determine, based on first external parameter values used by the first camera, a first mapping point set by mapping the first feature point set to a reference mapping plane; determine, based on M predetermined adjustment modes, M groups of intermediate external parameter values by adjusting second external parameter values used by the second camera, wherein M is an integer greater than or equal to 2, and each of the M predetermined adjustment modes comprises a predetermined step length; determine, for each adjustment mode of the M predetermined adjustment modes, a second mapping point set corresponding to the adjustment mode by mapping the second feature point set to the reference mapping plane based on a group of intermediate external parameter values, wherein the group of intermediate external parameter values is one of the M groups of intermediate external parameter values and is determined based on the adjustment mode; determine a distance between the first mapping point set and the second mapping point set as a distance corresponding to the adjustment mode; adjust, based on the distance and the predetermined step length, the second external parameter values; complete calibration of the second external parameter values based on a determination that distances corresponding to the respective M predetermined adjustment modes meet an iteration termination condition; and return to determine the M groups of intermediate external parameter values based on a determination that the distances corresponding to the respective M predetermined adjustment modes do not meet the iteration termination condition.

In another aspect, an electronic apparatus for camera calibration is disclosed. The electronic apparatus includes a first determination module, configured to determine a first feature point set of a first original image captured by a first camera and a second feature point set of a second original image captured by a second camera, wherein the first feature point set corresponds to the second feature point set; a first mapping module, configured to determine, based on first external parameter values used by the first camera, a first mapping point set by mapping the first feature point set to a reference mapping plane; a parameter adjustment module, configured to determine, based on M predetermined adjustment modes, M groups of intermediate external parameter values by adjusting second external parameter values used by the second camera, wherein M is an integer greater than or equal to 2, and each of the M predetermined adjustment modes comprises a predetermined step length; a second mapping module, configured to determine, for each adjustment mode of the M predetermined adjustment modes, a second mapping point set corresponding to the adjustment mode by mapping the second feature point set to the reference mapping plane based on a group of intermediate external parameter values, wherein the group of intermediate external parameter values is one of the M groups of intermediate external parameter values and is determined based on the adjustment mode; a first computation module, configured to determine a distance between the first mapping point set and the second mapping point set as a distance corresponding to the adjustment mode; and an external parameter-calibration module, configured to: adjust, based on the distance and the predetermined step length, the second external parameter values; complete calibration of the second external parameter values based on a determination that distances corresponding to the respective M predetermined adjustment modes meet an iteration termination condition; and iterate, by the parameter adjustment module, to determine the M groups of intermediate external parameter values based on a determination that the distances corresponding to the respective M predetermined adjustment modes do not meet the iteration termination condition.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Herein, example implementations are described in detail and illustrated in accompanying drawings. When the following description refers to the accompanying drawings, unless otherwise indicated, the same numbers in different drawings represent the same or similar elements. The following example implementations described as follows do not represent all implementations consistent with this disclosure. Instead, they are only described as methods and apparatuses reflecting some or all of the aspects of this disclosure in accordance with the appended claims.

The terms used in the disclosure is purposed for describing implementations only not intended to limit the disclosure. As used in this disclosure and the appended claims, singular forms of "a," "an," "said," and "the" are also intended to include plural forms thereof, unless the context clearly indicates otherwise. It should be understood that the term "and/or" as used herein refers to and includes any and all possible combinations of one or more of their associated listed items.

It should also be understood that although the terms "first," "second," "third," etc. are used to describe various kinds of information in this disclosure, the information should not be limited to those terms. Those terms are only used to distinguish the same type of information from one another. For example, without departing from the scope of this disclosure, the first information can also be referred to as the second information, and similarly, the second information can also be referred to as the first information. Depending on the context, the word "if" as used herein can be interpreted as "when" or "while" or "in response to."

This disclosure provides new technical solutions that can reduce or avoid artificial intervention in camera calibration processes and improve efficiency of camera calibration. In the disclosed technical solutions, image feature points can be extracted from respective original images captured by a first camera and a second camera. Based on matched feature points, according to predetermined iteration modes, a second group of external parameter values can be iterated. Poses and positions of the first and second cameras can require little or none manual adjustment or intervention to shoot for the original images. Using scene contents of the original images captured by the first and second cameras, external parameters of the second camera can be calibrated. This process can greatly shorten the calibration process for the external parameter values of the second camera, increase the efficiency of camera calibration, and facilitate mass production of binocular and multi-camera equipment.

Figure 1:
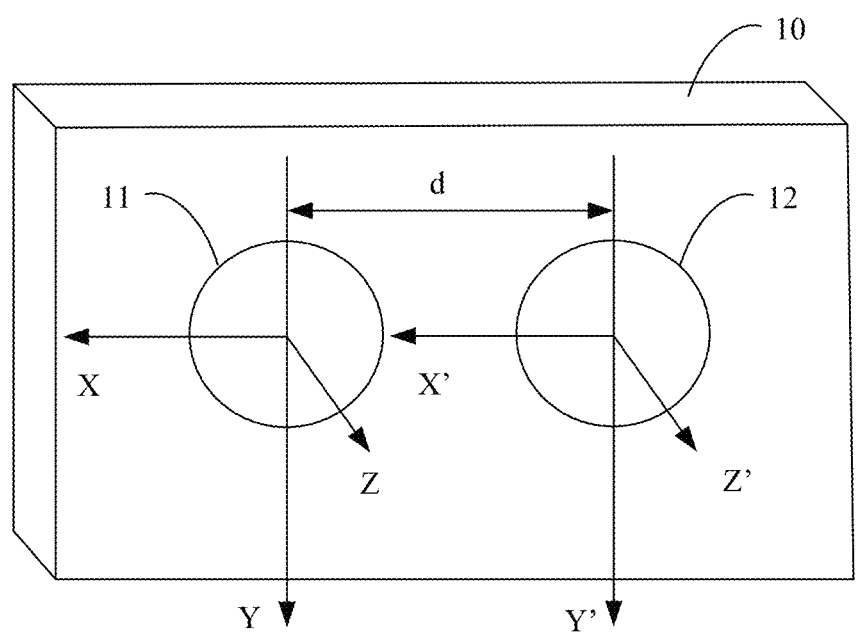
FIG. 1 is a diagram of a first example camera and a second example camera for camera calibration according to implementations of this disclosure.

FIG. 1 is a diagram of a first example camera and a second example camera for camera calibration according to implementations of this disclosure. As shown in FIG. 1, a "camera calibration" in this disclosure refers to determining a spatial relationship of a second camera 12 with respect to a first camera 11. For example, the spatial relationship can include a distance between respective optical centers of the first camera 11 and the second camera 12, and a rotation angle between respective optical axes of the first camera 11 and the second camera 12. Each of the first camera 11 and the second camera 12 can include one or more camera internal parameters (referred to as "internal parameters" hereinafter for simplicity) and one or more camera external parameters (referred to as "external parameters" hereinafter for simplicity). The internal parameters can represent characteristics of a camera itself, and can include, for example, a focal length of the camera, a pixel size of the camera, etc. The external parameters can represent a positional relationship of an optical center or an optical axis of the camera with respect to a reference coordinate system. For example, the external parameters can be expressed as $[\alpha,\beta,\gamma,t_1,t_2,t_3]^T$, in which $\alpha,\beta,\gamma$ represent rotational angles of the optical axis of the camera with respect to the X-, Y-, and Z-axis of a 3D reference coordinate system, and $t_1,t_2,t_3$ represent translational shifts of the optical center of the camera with respect to the origin of the 3D reference coordinate system on the X-, Y-, and Z-axis. When values of the internal parameters of the first camera 11 and the second camera 12 have been determined and values of the external parameters of the first camera 11 is known (e.g., the external parameters of the first camera 11 can be set by default as $[0,90,0,0,0]^T$), values of the external parameters of the second camera 12 can be determined, which can also be referred hereinafter to as "calibration" on the external parameters of the second camera 12.

Theoretical basis used in this disclosure will be explained below. For a pixel P in an original image captured by a camera, spatial coordinates C(x,y,z) of the pixel P within a camera coordinate system can be determined based on internal and external parameters of the camera. Specific methods for such coordinate determination can include any calibration technique known to those skilled in the art and will not be described in detail herein.

According to a relationship between a world coordinate system W and the camera coordinate system C (as shown in Eqs. (1) and (2) below), coordinates of the pixel P in the world coordinate system can be determined from its coordinates in the camera coordinate system. That is, the pixel P in the camera coordinate system C can be mapped to the world coordinate system W to determine a mapping point D.

$$C = RW + T \qquad \text{Eq. (1)}$$

$$W = R^{-1}(C - T) \qquad \text{Eq. (2)}$$

$$R = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\alpha & -\sin\alpha & 0 \\ \sin\alpha & \cos\alpha & 0 \\ 0 & 0 & 1 \end{bmatrix} \qquad \text{Eq. (3)}$$

$$T = [t_1 \ t_2 \ t_3]^T \qquad \text{Eq. (4)}$$

In Eqs. (1)-(4), R represents a rotation matrix, and T represents a translation vector.

For example, in a scenario when the reference mapping plane is a spherical mapping plane, the world coordinate system W can include parameters of the spherical mapping plane, such as, for example, a radius r, a longitude $\phi$, and a latitude $\theta$. A mapping point D corresponding to the pixel P can be located on the reference mapping plane with coordinate represented as $(r\phi,r\theta)$. The radius of the spherical mapping plane can be determined by calibrating a lens of the camera in advance and can be deemed as a known variable. Therefore, in a precondition that the values of the internal parameters of the camera are fixed, mapping the pixel P of the original image to be the mapping point D on the spherical mapping plane can mainly rely on values of the external parameters $\alpha,\beta,\gamma,t_1,t_2,t_3$ of the camera.

For example, for the first camera 11 and the second camera 12 shown in FIG. 1, assuming that the values of the external parameters of the first camera 11 are fixed (e.g., $[0,90,0,0,0,0]^T$), the values of the external parameters $[\alpha,\beta,\gamma,t_1,t_2,t_3]^T$ of the second camera are to be calibrated. The mapping point of the pixel P in the first original image captured by the first camera can be a first mapping point D on the reference mapping plane. The mapping point of a pixel P' that is matched with the pixel P in the second original image captured by the second camera can be a second mapping point D' on the reference mapping plane.

The first mapping point D and the second mapping point D' can be referred to as a mapping point pair. The distance between the mapping point pair can be related to the values of the external parameters $\alpha,\beta,\gamma,t_1,t_2,t_3$ of the second camera.

In addition, when distances between all mapping point pairs on the reference mapping plane are added in accordance with Eq. (5) as shown below, a distance f related to the values of the external parameters of second camera 12 can be obtained:

$$f=|D_1-D'_1|+|D_2-D'_2|+L+|D_N-D'_N| \qquad \text{Eq. (5)}$$

The following implementations are provided to further described this disclosure.

Figure 2A:
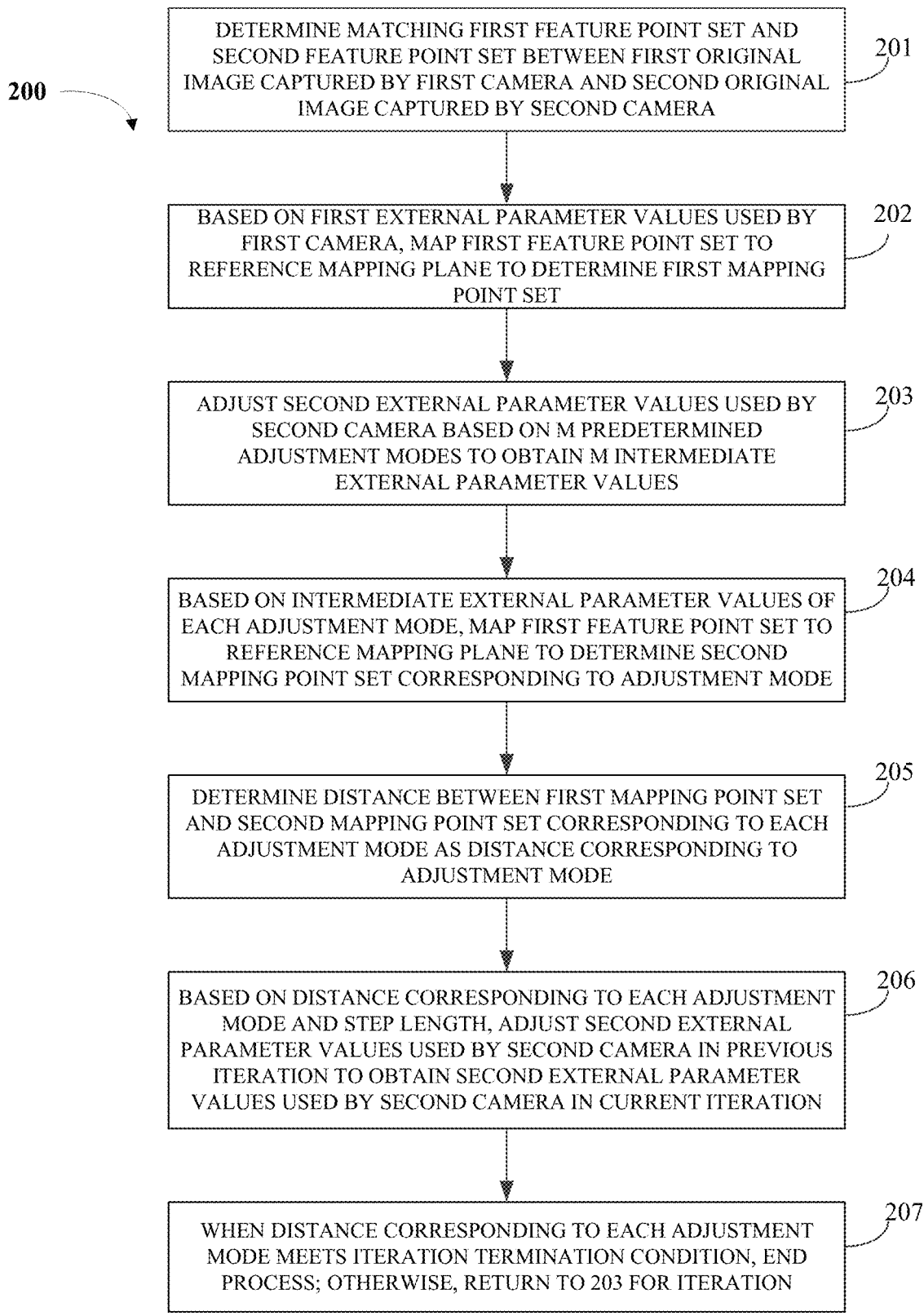
FIG. 2A is a flowchart of an example process of camera calibration according to implementations of this disclosure.
Figure 2B:
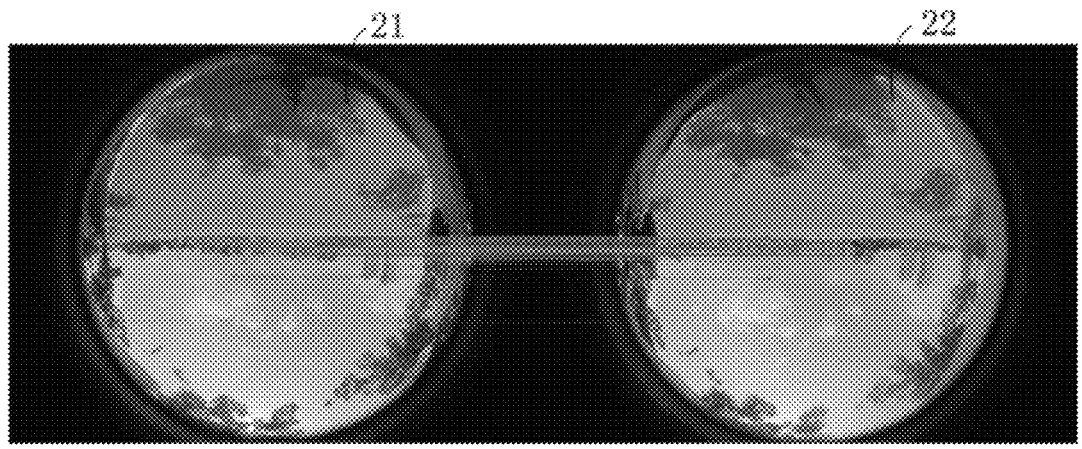
FIG. 2B is a diagram of a first original image and a second original image in the example process of FIG. 2A.
Figure 2C:
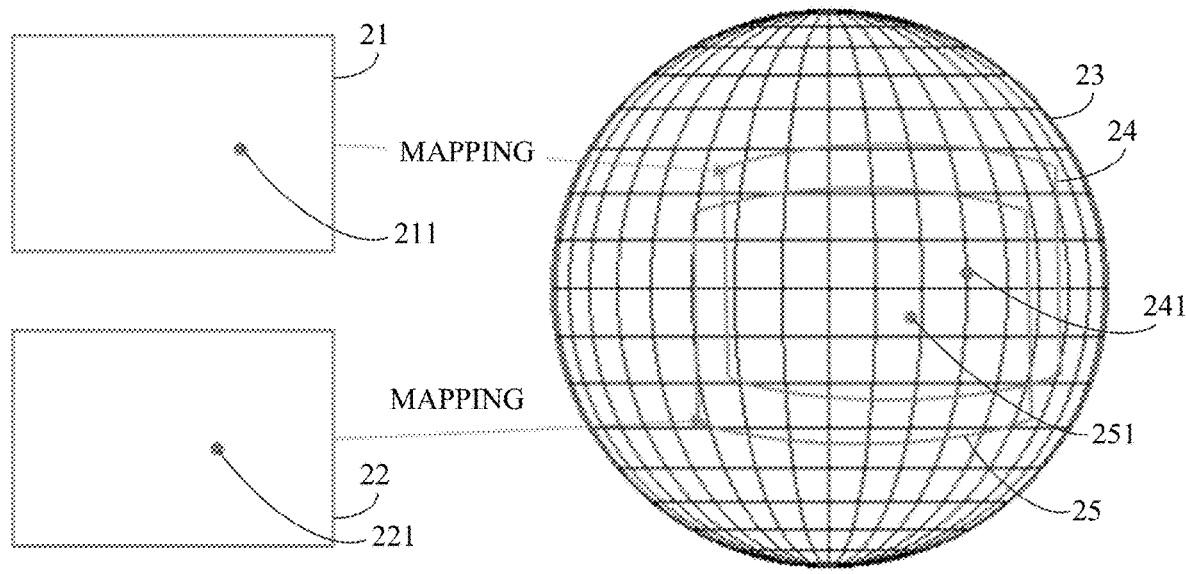
FIG. 2C is a diagram of an example mapping point on an example reference mapping plane mapped from a point in the first feature point set in the example process of FIG. 2A.

FIG. 2A is a flowchart of an example process 200 of camera calibration according to implementations of this disclosure. FIG. 2B is a diagram of a first original image and a second original image in the example process of FIG. 2A. FIG. 2C is a diagram of a first mapping point D on the reference mapping plane mapped from a first feature point P in the example process of FIG. 2A. This process 200 can be used on a binocular camera or a multi-camera, and will be described in combination with FIG. 1. As shown in FIG. 2A, the process 200 can include the following operations.

At operation 201, a first feature point set of a first original image captured by a first camera and a second feature point set of a second original image captured by a second camera are determined, in which the first feature point set corresponds to the second feature point set. In some implementations, the first feature point set and the second feature point set can include N first feature points and N second feature points, respectively. For example, each of the first feature points can be matched to one and only one of the second feature points. N can be an integer greater than or equal to 2.

At operation 202, based on a first group of external parameter values used by the first camera, a first mapping point set is determined by mapping the first feature point set to a reference mapping plane. In some implementations, the mapping the first feature point set to the reference mapping plane based on the first group of external parameter values can include: determining, based on the first group of external parameter values, a first mapping point mapped to the reference mapping plane for each first feature point of the first feature point set; and forming the first mapping point set using the determined first mapping points.

At operation 203, a second group of external parameter values used by the second camera is adjusted based on M predetermined adjustment modes to determine M groups of intermediate external parameter values. In some implementations, M can be an integer greater than or equal to 2. Each of the M predetermined adjustment modes can include (e.g., use) a predetermined step length.

At operation 204, for each adjustment mode of the M predetermined adjustment modes, a second mapping point set corresponding to the adjustment mode is determined by mapping the second feature point set to the reference mapping plane based on a group of intermediate external parameter values determined based on the adjustment mode. In some implementations, the mapping the second feature point set to the reference mapping plane based on the group of intermediate external parameter values can include: determining, based on the group of intermediate external parameter values, a second mapping point mapped to the reference mapping plane for each second feature point of the second feature point set; and forming the second mapping point set using the determined second mapping points.

At operation 205, a distance between the first mapping point set and the second mapping point set corresponding to each of the adjustment modes is determined as a distance corresponding to the adjustment mode. In some implementations, determining the distance between the first mapping point set and the second mapping point set can include: determining distances between each second mapping point of the second mapping point set and a first mapping point that matches with the second mapping point in the first mapping point set; and determining a sum of the distances as the distance between the first mapping point set and the second mapping point set At operation 206, based on the distance corresponding to the adjustment mode and the predetermined step length of the adjustment mode, the second group of external parameter values used by the second camera in an immediately previous iteration is adjusted to determine the second group of external parameter values of the second camera in a current iteration. That is, the second group of external parameter values is adjusted to calibrate the external parameters of the second camera.

At operation 207, based on a determination that distances corresponding to the respective M predetermined adjustment modes meet an iteration termination condition, the process 200 is terminated. Otherwise, the process 200 can return to the operation 203 to continue iterations.

In some implementations, at the aforementioned operation 201, the first camera 11 and the second camera 12 can have the same type of lens as shown in FIG. 1. For example, the lens of the first camera 11 and the second camera 12 can both be a fish-eye lens or a wide-angle lens. The first camera 11 and the second camera 12 can be used to capture a scene, respectively, and a first original image 21 and a second original image 22 can be obtained and shown in FIG. 2B. In an implementation, feature points in the first original image 21 and the second original image 22 can be determined based on any feature point-extraction techniques (e.g., algorithms) well-known to those skilled in the art. For example, the feature points can be scale-invariant feature transform (SIFT) feature points. It can be assumed that the first feature point set identified in the first original image 21 is ($P_1,P_2,L,P_N$) and the second feature point set identified in the second original image 22 is ($P'_1,P'_2,L, P'_N$). N can represent the number of feature points included in the first feature point set and the second feature point set. A first feature point P and a second feature point P' which are matched between the first feature point set and the second feature point set can be referred to as a feature point pair and can be represented as ($P_1-P'_1,P_2-P'_2,L, P_N-P'_N$). For example, as shown in FIG. 2B, endpoints of the lines connecting the first original image 21 and the second original image 22 can be used to indicate the matching first and second feature points in the first original image 21 and the second original image 22. The feature points included in each of the first original image 21 and the second original image 22 can be represented by pixel coordinates.

In some implementations, at the aforementioned operation 202, the first camera 11 can be set as a reference camera, and the first group of external parameter values used by the first camera 11 can be set as $[0,90,0,0,0,0]^T$. In such a case, based on the first group of external parameter values, the first feature point set can be mapped to the reference mapping plane to obtain the first mapping point set ($D_1,D_2, L, D_N$). The first feature point $P_1$ in the first feature point set can correspond to the first mapping point $D_1$ in the first mapping point set. Similarly, the first feature point $P_N$ in the first feature point set can correspond to the first mapping point $D_N$ in the first mapping point set, and so on. In an implementation, the reference mapping plane can be a spherical mapping plane corresponding to the first camera, and the radius corresponding to the spherical mapping plane can be determined by calibrating the lens of the first camera. In another implementation, the reference mapping plane can be a plane determined by performing a planar mapping in accordance with longitude and latitude to the spherical mapping plane corresponding to the first camera.

It should be understood that each of first feature points in the first feature point set can be mapped to the reference mapping plane based on mathematical conversion relationships between the world coordinate system, the camera coordinate system, and an image coordinate system. As shown in FIG. 2C, a first feature point 211 and a second feature point 221 in original images 21 and 22 on the left, respectively, can be mapped by the operation 202 to a mapping plane on the right as a first mapping point 241 and a second mapping point 251, respectively. A corresponding relationship between a mapping point D on the mapping plane and a feature point P in an original image captured by the camera.

In some implementations, at the operation 203, the second camera 12 can be a camera to be calibrated. The second group of external parameter values used by the second camera 12 can be set as initial values $[0,90,0,0,0,0]^T$. The second group of external parameter values can be adjusted according to one or more (e.g., M) predetermined adjustment modes. For example, for each of M adjustment modes, a group of intermediate external parameter values can be determined. In an implementation, external parameters having the same physical meaning can be set to use the same step length for iterations (referred to as an "iteration step length"). For example, for the external parameters α,β,γ that represent rotation angles, an iteration step length Δs can be determined from experiments. For the external parameters $t_1,t_2,t_3$ that represent translation amounts, an iteration step length Δm can also be determined from experiments. In another implementation, one iteration step length can be set for each of the external parameters, such that the iteration process of each external parameter can be adjusted based on different step lengths. In this way, the accuracy of the calibration of the second group of external parameter values can be improved while the converging speed of the overall iteration process can be increased.

In an implementation, the adjustment modes can include adjusting the external parameters of the second camera one by one, and increasing or decreasing the value of a parameter by a predetermined step length corresponding to the parameter. For example, assuming that the second group of external parameter values are $[0.11,90.2,0.13,4.1,5.3,4.7]^T$, by increasing the value of the parameter α by a step length 0.1 corresponding to the parameter α, a group of intermediate external parameter values $[0.21,90.2,0.13,4.1,5.3,4.7]^T$ can be obtained. By increasing the values of the parameters β and γ by step lengths 0.1 corresponding to the parameters β and γ, respectively, two groups of intermediate external parameter values $[0.11,90.3,0.13,4.1,5.3,4.7]^T$ and $[0.11, 90.2,0.23,4.1,5.3,4.7]^T$ can be obtained. Similarly, by increasing the parameters $t_1,t_2,t_3$ by their respective step lengths, another three groups of intermediate external parameter values can be obtained. In this way, there are six adjustment modes, and six groups of intermediate external parameter values can be determined.

In another implementation, the angle parameters α,β,γ can be respectively and synchronously increased by a corresponding step length 0.1 to obtain a group of intermediate external parameter values. The translation parameters $t_1,t_2,t_3$ can also be respectively and synchronously increased by a corresponding step length to obtain another group of intermediate external parameter values. In this way, there are two adjustment modes, and two groups of intermediate external parameter values can be determined.

It can be seen that the number M of the groups of intermediate external parameter values obtained by each iteration is related to the way of adjusting the external parameters. For example, the aforementioned six external parameters are adjusted one by one, and for each iteration, six groups of intermediate external parameter values can be obtained. If the external parameters having the same physical meaning are adjusted synchronously, for each iteration, two groups of intermediate external parameter values can be obtained.

At the operation 204, for example, based on the respective groups of intermediate external parameter values corresponding to the six adjustment modes, the second feature point set $(P'_1, P'_2, L, P'_N)$ can be mapped to the reference mapping plane to obtain six second mapping point sets respectively corresponding to the six adjustment modes: $(D'_1(\alpha), D'_2(\alpha), L, D'_N(\alpha))$, $(D'_1(\beta), D'_2(\beta), L, D'_N(\beta))$, $(D'_1(\gamma), D'_2(\gamma), L, D'_N(\gamma))$, $(D'_1(t_1), D'_2(t_1), L, D'_N(t_1))$, $(D'_1(t_2), D'_2(t_2), L, D'_N(t_2))$, and $(D'_1(t_3), D'_2(t_3), L, D'_N(t_3))$.

In an implementation, the reference mapping plane can be a spherical mapping plane determined from the calibration that is based on a lens of the first camera. As shown in FIG. 2C, in a case that lenses of the first camera 11 and the second camera 12 are fisheye lenses, by mapping the first original image 21 and the second original image 22 to a spherical mapping plane 23, a first mapping image 24 and a second mapping image 25 can be determined, respectively. The first feature point 211 on the first original image 21 corresponds to a first mapping point 241 on the spherical mapping plane 23, and the second feature point 221 on the second original image 22 corresponds to a second mapping point 251 on the spherical mapping plane 23. Similarly, multiple different feature points can correspond to multiple respective different mapping points. It should be noted that the rectangular shapes of the first original image 21 and the second original image 22 in FIG. 2C are purposed for example illustrations only. The first original image 21 and the second original image 22 can be images of any shape, and this disclosure does not impose any limitation thereon.

In another implementation, the reference mapping plane can be a plane determined by performing a planar mapping in accordance with the longitude and latitude to the aforementioned spherical mapping plane.

At the operation 205, distances between the first mapping point set and the second mapping point sets corresponding to the respective six adjustment modes can be computed and used as distances corresponding to the respective six adjustment modes in a current iteration. For example, the distances corresponding to the respective six adjustment modes in the current iteration can be represented as:

$$f_\alpha(i) = |D_1 - D'_1(\alpha)| + |D_2 - D'_2(\alpha)| + L + |D_N - D'_N(\alpha)| \quad \text{Eq. (6-1)}$$

$$f_\beta(i) = |D_1 - D'_1(\beta)| + |D_2 - D'_2(\beta)| + L + |D_N - D'_N(\beta)| \quad \text{Eq. (6-2)}$$

$$f_\gamma(i) = |D_1 - D'_1(\gamma)| + |D_2 - D'_2(\gamma)| + L + |D_N - D'_N(\gamma)| \quad \text{Eq. (6-3)}$$

$$f_{t_1}(i) = |D_1 - D'_1(t_1)| + |D_2 - D'_2(t_1)| + L + |D_N - D'_N(t_1)| \quad \text{Eq. (6-4)}$$

$$f_{t_2}(i) = |D_1 - D'_1(t_2)| + |D_2 - D'_2(t_2)| + L + |D_N - D'_N(t_2)| \quad \text{Eq. (6-5)}$$

$$f_{t_3}(i) = |D_1 - D'_1(t_3)| + |D_2 - D'_2(t_3)| + L + |D_N - D'_N(t_3)| \quad \text{Eq. (6-6)}$$

In Eqs. (6-1) to (6-6), $f_\alpha(i)$ represents a distance corresponding to the $i^{th}$ adjustment of the parameter $\alpha$, $f_\beta(i)$ represents a distance corresponding to the $i^{th}$ adjustment of the parameter $\beta$, $f_\gamma(i)$ represents a distance corresponding to the $i^{th}$ adjustment of the parameter $\gamma$, $f_{t_1}(i)$ represents a distance corresponding to the $i^{th}$ adjustment of the parameter $t_1$, $f_{t_2}(i)$ represents a distance corresponding to the $i^{th}$ adjustment of the parameter $t_2$, and $f_{t_3}(i)$ represents a distance corresponding to the $i^{th}$ adjustment of the parameter $t_3$.

At the operation 207, in an implementation, it can be determined whether an iteration termination condition is met based on absolute values of differences (also referred to as "absolute differences") between distances corresponding to the respective six adjustment modes in the current iteration and respective distances corresponding to the respective six adjustment modes in a previous (e.g., immediate previous) iteration. For example, when in the adjustment mode that the parameter value $\alpha$ is adjusted by the predetermined step length, an absolute difference $|f_\alpha(i) - f_\alpha(i-1)|$ can be determined between the distance $f_\alpha(i)$ corresponding to the $i^{th}$ adjustment of the parameter $\alpha$ and the distance $f_\alpha(i-1)$ corresponding to the $(i-1)^{th}$ adjustment of the parameter $\alpha$. The remaining five parameters can be processed similarly to the parameter $\alpha$, such that six absolute differences can be obtained. When a sum of the six absolute differences is less than or equal to a predetermined first threshold $\varepsilon 1$, it can be indicated that the iteration process is approaching stableness, such that the iteration can be terminated. In other words, the iteration termination condition can be represented as the following Eq. (7):

$$(|f_\alpha(i)-f_\alpha(i-1)|+|f_\beta(i)-f_\beta(i-1)|+|f_\gamma(i)-f_\gamma(i-1)|+|f_{t_1}(i)-f_{t_1}(i-1)|+|f_{t_2}(i)-f_{t_2}(i-1)|+|f_{t_3}(i)-f_{t_3}(i-1)|) \leq \varepsilon 1 \quad \text{Eq. (7)}$$

In another implementation, it can be determined whether to terminate the iteration by determining whether the distances corresponding to the respective M adjustment modes obtained in the current iteration are smaller than or equal to respective predetermined second thresholds. For example, when in the adjustment mode that the values of parameters $\alpha, \beta, \gamma, t_1, t_2, t_3$ are respectively adjusted for iteration, the distances corresponding to the six adjustment modes obtained in the it iteration can be respectively expressed as: $f_\alpha(i)$, $f_\beta(i)$, $f_\gamma(i)$, $f_{t_1}(i)$, $f_{t_2}(i)$, and $f_{t_3}(i)$. If the iteration termination condition is met as shown in Eq. (8), it can be indicated that the overall deviation of the distances between the first mapping point set and the second mapping point set that is determined based on mapping each of the current external parameters is relatively close, and the iteration can be terminated.

$$f_\alpha(i) \leq \varepsilon 2 \ \& \ f_\beta(i) \leq \varepsilon 3 \ \& \ f_\gamma(i) \leq \varepsilon 4 \ \& \ f_{t_1}(i) \leq \varepsilon 5 \ \& \ f_{t_2}(i) \leq \varepsilon 6 \ \& \ f_{t_3}(i) \leq \varepsilon 7 \quad \text{Eq. (8)}$$

In Eq. (8), $\varepsilon 2$ represents a second threshold predetermined for the adjustment mode in which the parameter $\alpha$ is adjusted by a predetermined step length. $\varepsilon 3$ represents a second threshold predetermined for the adjustment mode in which the parameter $\beta$ is adjusted by a predetermined step length. $\varepsilon 4$ represents a second threshold predetermined for the adjustment mode in which the parameter $\gamma$ is adjusted by a predetermined step length. $\varepsilon 5$ represents a second threshold predetermined for the adjustment mode in which the parameter $t_1$ is adjusted by a predetermined step length. $\varepsilon 6$ represents a second threshold predetermined for the adjustment mode in which the parameter $t_2$ is adjusted by a predetermined step length. $\varepsilon 7$ represents a second threshold predetermined for the adjustment mode in which the parameter $t_3$ is adjusted by a predetermined step length. Each of the second thresholds ε2 to ε7 can be the same or different, and can be set according to actual needs.

In another implementation, the iteration termination condition can further include that the total number of iterations is greater than or equal to a predetermined third threshold.

When the total number of iterations is greater than or equal to the third threshold, it may indicate that the number of iterations is sufficient, so that it can be determined that the iteration process for the second group of external parameter values is terminated. For example, assuming that the third threshold is 5, under the premise that the respective distances corresponding to the M compensation modes do not need to terminate the iteration, the operation 203 can continue to be performed if the total number of times until the current iteration is 4. However, if the total number of iterations up to the current iteration is 5, the iteration process can be terminated, and the calibration result for the second camera can be obtained based on the operation 206. Limiting the iteration process by limiting the total number of iterations can improve the efficiency of the calibration camera.

When the total number of iterations is greater than or equal to the third threshold, the number of iterations can be deemed as sufficient enough to determine that the iteration process for the second group of external parameter values can be terminated. For example, assuming that the third threshold is five, under a precondition that the iteration of determining the distances corresponding to the respective M adjustment modes does not need to be terminated, the operation 203 can continue to be performed if the total number of times in the current iteration is 4. However, if the total number of iterations up to the current iteration is 5, the iteration process can be terminated, and the calibration result for the second camera can be obtained based on the operation 206. Limiting the iteration process by limiting the total number of iterations can improve the efficiency of the camera calibration.

From the above description, it can be seen that when the first camera is used as a reference and the second camera is to be calibrated, the first feature points and the second feature points can be extracted from the original images captured by the first camera and the second camera, respectively. The external parameter values of the second camera can be iteratively adjusted based on the distances between the matching first and second feature points on the mapping reference plane. In this way, it is not necessary to manually adjust the poses and positions of the first camera and the second camera. The scene contents in the original images captured by the first camera and the second camera can be directly used for calibration, which can greatly shorten the calibration process. This can effectively improve the efficiency of the camera calibration and facilitate the mass production of binocular and multi-camera equipment.

Figure 3:
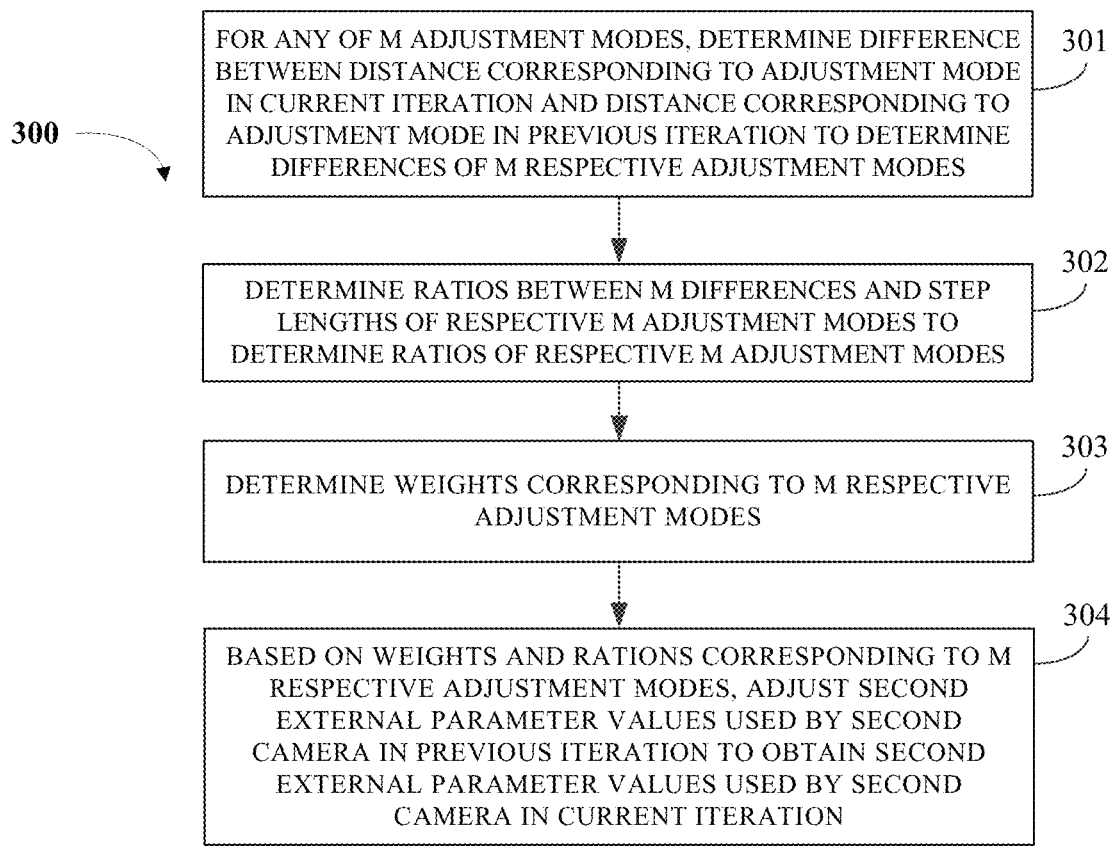
FIG. 3 is a flowchart of another example process of camera calibration according to implementations of this disclosure.

FIG. 3 is a flowchart of an example process 300 of camera calibration according to implementations of this disclosure. An implementation of the process 300 can be described based on the implementations set forth in FIG. 2A, and use the calibration of the external parameters of the second camera as an example in conjunction with FIG. 1. As shown in FIG. 3, the process 300 includes the following operations.

At operation 301, M differences of the respective M adjustment modes are determined by determining, for any adjustment mode of the M adjustment modes, a difference (e.g., an absolute difference) between a distance corresponding to the adjustment mode in a current iteration and a distance corresponding to the adjustment mode in an immediately previous iteration.

At operation 302, M ratios of the respective M adjustment modes are determined by determining ratios between the M differences of the respective M adjustment modes and the respective predetermined step lengths of the respective M adjustment modes.

At operation 303, weights corresponding to the respective M adjustment modes are determined.

At operation 304, based on the M ratios and the weights corresponding to the respective M adjustment modes, a second group of external parameter values of the second camera in the immediately previous iteration is adjusted to determine a second group of external parameter values of the second camera in the current iteration, which is calibration of the external parameters of the second camera.

At the operation 301, for example, in the adjustment mode that the parameter α is adjusted by a step length Δs, the distance in the $i^{th}$ iteration can be represented as the following Eq. (9-1):

$$f_\alpha(i)=|D_1-D'_1(\alpha)|+|D_2-D'_2(\alpha)|+L+|D_N-D'_N(\alpha)| \qquad \text{Eq. (9-1)}$$

In Eq. (9-1), $D'_1(\alpha)$, $D'_2(\alpha)$, ..., $D'_N(\alpha)$ represent the second mapping points determined by mapping the second feature points to the reference mapping plane based on the group of intermediate external parameter values obtained from the $i^{th}$ adjustment of the parameter α.

The distance in the $(i-1)^{th}$ iteration can be represented as the following Eq. (9-2):

$$f_\alpha(i-1)=|D_1-D'_1(\alpha,\Delta s)|+|D_2-D'_2(\alpha,\Delta s)|+L+|D_N-D'_N(\alpha,\Delta s)| \qquad \text{Eq. (9-2)}$$

In Eq. (9-2), $D'_1(\alpha,\Delta s)$, $D'_2(\alpha,\Delta s)$, ..., $D'_N(\alpha,\Delta s)$ represent the second mapping points determined by mapping the second feature points to the reference mapping plane based on the group of intermediate external parameter values obtained from the $(i-1)^{th}$ adjustment of the parameter α.

Based on the above computation, a difference between the distance corresponding to the adjustment mode in which the parameter α is adjusted by a step length Δs in the current iteration and the distance in the immediately previous iteration can be determined as $f_\alpha(i)-f_\alpha(i-1)$. Similarly, the differences corresponding to the adjustment modes in which the parameters $\beta,\gamma,t_1,t_2,t_3$ are adjusted by step lengths can be determined as $f_\beta(i)-f_\beta(i-1)$, $f_\gamma(i)-f_\gamma(i-1)$, $f_{t_1}(i)-f_{t_1}(i-1)$, $f_{t_2}(i)-f_{t_2}(i-1)$, and $f_{t_3}(i)-f_{t_3}(i-1)$.

At the operation 302, when in the adjustment mode that the parameter α is adjusted by the step length Δs, a ratio between the difference corresponding to the adjustment mode and the step length can be determined as shown in the following Eq. (10-1):

$$\frac{\partial f}{\partial \alpha}=\frac{f_\alpha(i)-f_\alpha(i-1)}{\Delta s} \qquad \text{Eq. (10-1)}$$

Similarly, the ratios corresponding to the adjustment modes in which the parameters $\beta,\gamma,t_1,t_2,t_3$ are adjusted by step lengths can be determined as shown in the following Eqs. (10-2) to (10-6):

$$\frac{\partial f}{\partial \beta}=\frac{f_\beta(i)-f_\beta(i-1)}{\Delta s} \qquad \text{Eq. (10-2)}$$

$$\frac{\partial f}{\partial \gamma}=\frac{f_\gamma(i)-f_\gamma(i-1)}{\Delta s} \qquad \text{Eq. (10-3)}$$

-continued $$\frac{\partial f}{\partial t_1} = \frac{f_{t_1}(i) - f_{t_1}(i-1)}{\Delta m}$$  Eq. (10-4)

$$\frac{\partial f}{\partial t_2} = \frac{f_{t_2}(i) - f_{t_2}(i-1)}{\Delta m}$$  Eq. (10-5)

$$\frac{\partial f}{\partial t_3} = \frac{f_{t_3}(i) - f_{t_3}(i-1)}{\Delta m}$$  Eq. (10-6)

It can be understood that the step lengths $\Delta s$ and $\Delta m$ of the different adjustment modes can be the same or different, and this disclosure does not limit the specific values of the step lengths.

At the operation 303, the weights corresponding to the different adjustment modes can be the same or different, and this disclosure does not limit the specific values of the weights corresponding to the respective adjustment modes.

At the operation 304, the external parameter values of the second camera can be determined as shown in the following Eq. (11):

$$[\alpha(i), \beta(i), \gamma(i), t_1(i), t_2(i), t_3(i)]^T =$$  Eq. (11)
$$[\alpha(i-1), \beta(i-1), \gamma(i-1), t_1(i-1), t_2(i-1), t_3(i-1)]^T -$$
$$k * \left[\frac{\partial f}{\partial \alpha}, \frac{\partial f}{\partial \beta}, \frac{\partial f}{\partial \gamma}, \frac{\partial f}{\partial t_1}, \frac{\partial f}{\partial t_2}, \frac{\partial f}{\partial t_3}\right]^T$$

In Eq. (11), k represents a weight vector, and the number of the weights is the same as the number of the ratios. The smaller the k value is, the slower the iteration process will be, the more number of times the iterations will be, the smaller the vibration amplitudes will be, and the higher the accuracy of the final calibrated external parameters of the camera will be. The larger the k value is, the faster the iteration process will be, the fewer number of times the iterations will be, the larger the vibration amplitudes will be, and the accuracy of the final calibrated external parameters of the camera will be affected, but the calibration efficiency can be suitably improved.

In this implementation, the speed of the iteration process can be adjusted by the weights, and the iteration process can be flexibly controlled according to specific situations of the camera, by which the final calibrated external parameters of the second camera can be ensured to cause the captured images to have a better visual effect.

Figure 4A:
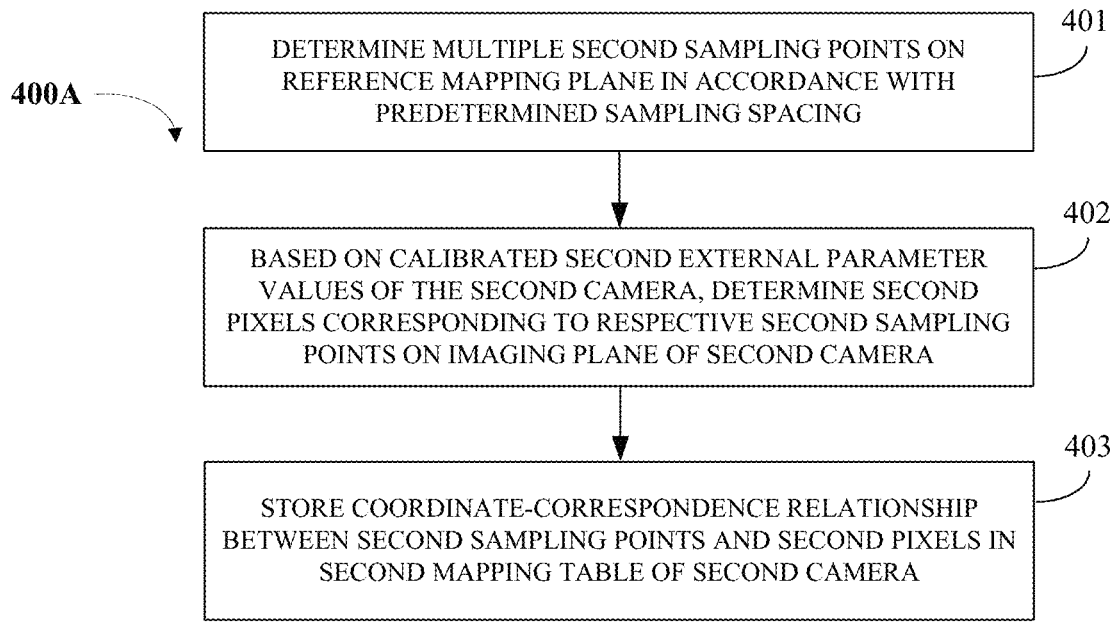
FIG. 4A is a flowchart of another example process of camera calibration according to implementations of this disclosure.
Figure 4B:
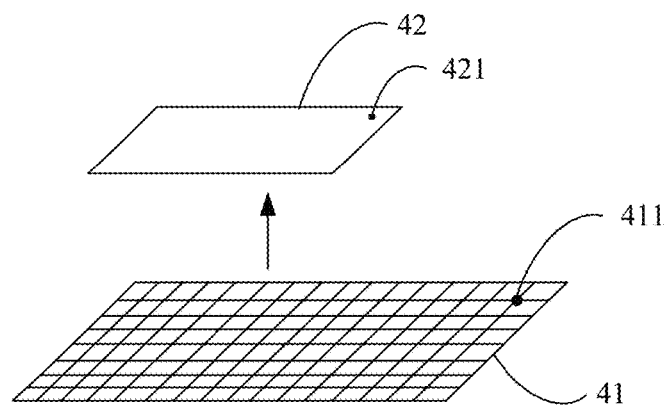
FIG. 4B is a diagram of a corresponding relationship between a reference mapping plane and an imaging plane in the example process of FIG. 4A.

FIG. 4A is a flowchart of an example process 400A of camera calibration according to implementations of this disclosure. FIG. 4B is a diagram of a corresponding relationship between a reference mapping plane and an imaging plane in the example process of FIG. 4A. An implementation of the process 400A can be described based on the implementations set forth in FIG. 2A, and use obtaining a second mapping table by calibrating the external parameters of the second camera as an example in conjunction with FIG. 2C. As shown in FIG. 4A, the process 400A includes the following operations.

At operation 401, multiple second sampling points are determined on a reference mapping plane in accordance with predetermined sampling spacing.

At operation 402, based on a second group of calibrated external parameter values of the second camera, multiple second pixels corresponding to the respective multiple second sampling points are determined on an imaging plane of the second camera.

At operation 403, a corresponding relationship of coordinates (referred to as a "coordinate-correspondence relationship" hereinafter for simplicity) between the multiple second sampling points and the multiple second pixels is stored or recorded in a second mapping table of the second camera.

At the operation 401, in an implementation, the predetermined sampling spacing can be determined according to an accuracy requirement of image processing. When the accuracy requirement is not high, the predetermined sampling spacing can be set larger. When the accuracy requirement is high, the predetermined sampling spacing can be set smaller. For example, for a reference mapping plane 41 shown in FIG. 4B, its size can be 1000*1000, the predetermined sampling spacing can be set as 50 pixels, and the resultant number of the multiple second sampling points can be 20*20.

At the operation 402, for any sampling point 411 on the reference mapping plane 41, based on the calibrated external parameters of the second camera and the internal parameters of the second camera, using a reverse process of the aforementioned process of determining the mapping points of the pixels of the captured image on the reference mapping plane, a pixel 421 corresponding to the sampling point 411 on an imaging plane (also referred to as an "image plane") 42 of the second camera can be determined. Correspondingly, for all sampling points on the reference mapping plane 41, corresponding pixels on the imaging plane 42 can be determined.

At the operation 403, for example, a coordinate-correspondence relationship between the multiple second sampling points ($P'_1, P'_2, L, P'_N$) and the multiple second pixels ($D''_1, D''_2, L, D''_N$) can be stored in the second mapping table. For example, when N is 400, it means that the imaging plane of the second camera and the reference mapping plane have 400 corresponding coordinate positions. Based on the corresponding relationship between the 400 coordinate positions, an image of a corresponding position on a subsequent image captured by the second camera can be directly projected onto the reference mapping plane, such that the time of re-computing the mapping points corresponding to the feature points based on coordinate transformation between the world coordinate system, the camera coordinate system, and the image coordinate system can be saved, and the calculation process can be simplified.

Similarly, for the first camera 11, multiple first sampling points can be determined on the first mapping plane in accordance with the predetermined sampling spacing. Based on the first group of external parameter values used by the first camera, multiple first pixels corresponding to the multiple first sampling points on an imaging plane of the first camera can be determined. A coordinate-correspondence relationship between the multiple first sampling points and the multiple first pixels can be recorded in a first mapping table of the first camera.

In this implementation, the coordinate-correspondence relationship between the reference mapping plane and the imaging plane of the camera can be stored using the first mapping table and the second mapping table. When a panoramic image of the binocular camera or multi-camera needs to be generated (e.g., by stitching), the original images captured by the camera can be directly mapped to the reference mapping plane. The mapping relationship between the feature point and the reference mapping plane need not be repeatedly calculated, which can simplify the process of the image processing.

Figure 5A:
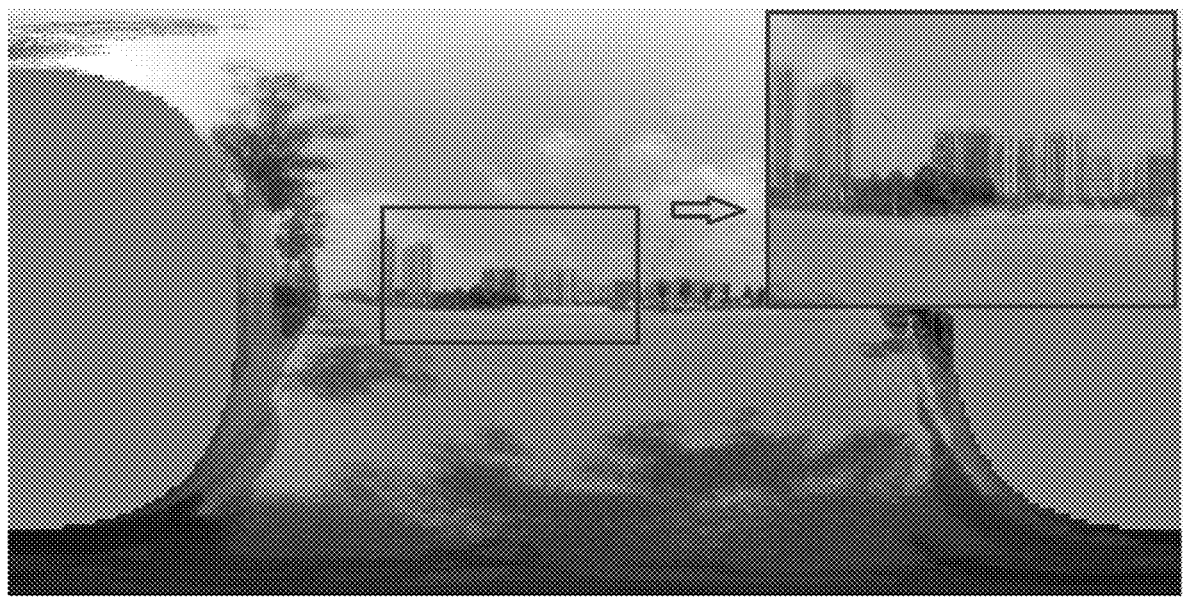
FIG. 5A is a diagram of an example projection image determined by mapping the second original image to the reference mapping plane using initial values of external parameters of the second example camera according to implementations of this disclosure.
Figure 5B:
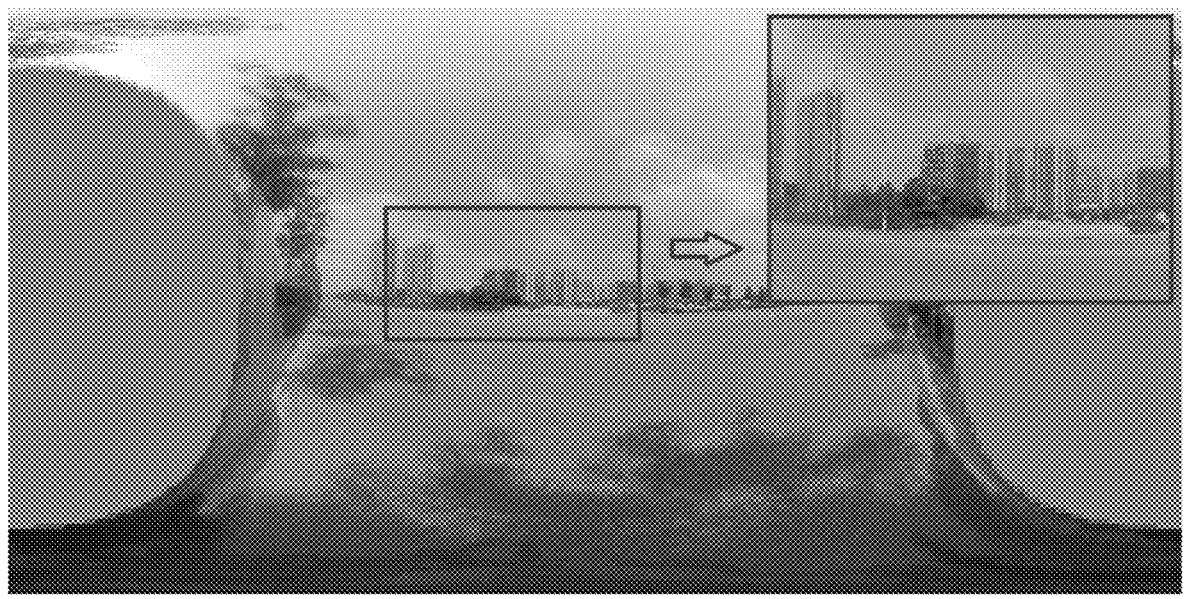
FIG. 5B is a diagram of an example projection image determined by mapping the second original image to the reference mapping plane using calibrated external parameters according to implementations of this disclosure.

FIG. 5A is a diagram of an example projection image determined by mapping the second original image captured by the second camera to the reference mapping plane using initial values of the external parameters of the second camera according to implementations of this disclosure. FIG. 5B is a diagram of an example projection image determined by mapping the second original image captured by the second camera to the reference mapping plane using calibrated external parameters of the second camera according to implementations of this disclosure. For the second original image 22 shown in FIG. 2B, based on the initial values $[0,90,0,0,0,0]^T$ of the extremal parameters $[\alpha,\beta,\gamma,t_1,t_2,t_3]T$ of the second camera 12, a reference image can be obtained by mapping the second original image 22 to the reference mapping plane. By overlapping the first original image 21 captured by the first camera 11 and the reference image, the image shown in FIG. 5A can be obtained. From the image shown in FIG. 5A, it can be clearly seen that a distant building and a nearby small tree are relatively blurred. That is, there is parallax and the image quality is not good.

For example, with the camera calibration method provided in this disclosure, the external parameters of the second camera 12 can be finally calibrated as $[\alpha,\beta,\gamma,t_1,t_2,t_3]T=[0.31,89.02,0.22,1.76,3.59,3.63]^T$. Based on the calibrated external parameter values of the second camera 12, the second original image 22 can be mapped to the reference mapping plane to obtain a new mapping image. The new mapping image can be overlapped with the first original image 21 captured by the first camera 11 to obtain the image shown in FIG. 5B. It is obvious from the image shown in FIG. 5B that the distant building is aligned in position, indicating a decreased parallax.

Figure 6:
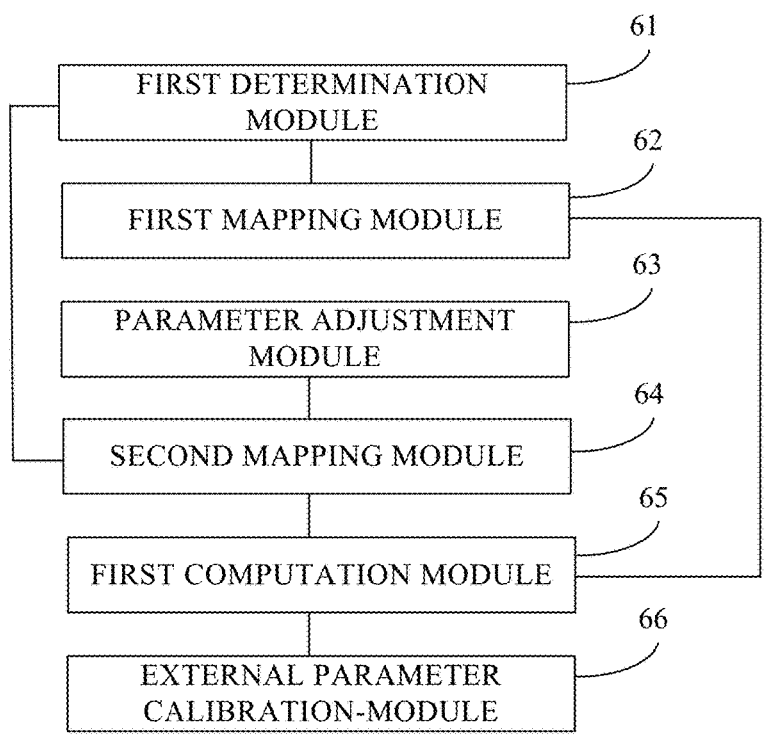
FIG. 6 is a diagram of structures of an example apparatus for camera calibration according to implementations of this disclosure.

FIG. 6 is a diagram of structures of an example apparatus for camera calibration according to implementations of this disclosure. As shown in FIG. 6, the camera calibration apparatus includes a first determination module 61, a first mapping module 62, a parameter adjustment module 63, a second mapping module 64, a computation module 65, and an external parameter-calibration module 66.

The first determination module 61 can be configured to determine a first feature point set of a first original image captured by a first camera and a second feature point set of a second original image captured by a second camera, in which the first feature point set corresponds to the second feature point set.

The first mapping module 62 can be configured to determine, based on a first group of external parameter values used by the first camera, a first mapping point set by mapping the first feature point set determined by the first determination module 61 to a reference mapping plane.

The parameter adjustment module 63 can be configured to adjust a second group of external parameter values used by the second camera based on M predetermined adjustment modes to determine M groups of intermediate external parameter values. In some implementations, M can be an integer greater than or equal to 2, and each of the adjustment modes can have a predetermined step length.

The second mapping module 64 can be configured to determine, for each adjustment mode, a second mapping point set corresponding to the adjustment mode by mapping the second feature point set determined by the first determination module 61 to the reference mapping plane based on a group of intermediate external parameter values determined by the parameter adjustment module 63 based on the adjustment mode.

The first computation module 65 can be configured to determine a distance between the first mapping point set determined by the first mapping module 62 and the second mapping point set corresponding to each adjustment mode determined by the second mapping module 64 as a distance corresponding to the adjustment mode.

The external parameter-calibration module 66 can be configured to adjust, based on the distance corresponding to each adjustment mode and the predetermined step length of the adjustment mode, the second group of external parameter values used by the second camera. The external parameter-calibration module 66 can be further configured to complete calibration of the second group of external parameter values used by the second camera based on a determination that distances corresponding to each adjustment mode meets an iteration termination condition, and otherwise, iterate, by the parameter adjustment module 63, to adjust the second group of external parameter values used by the second camera based on the M adjustment modes.

Figure 7:
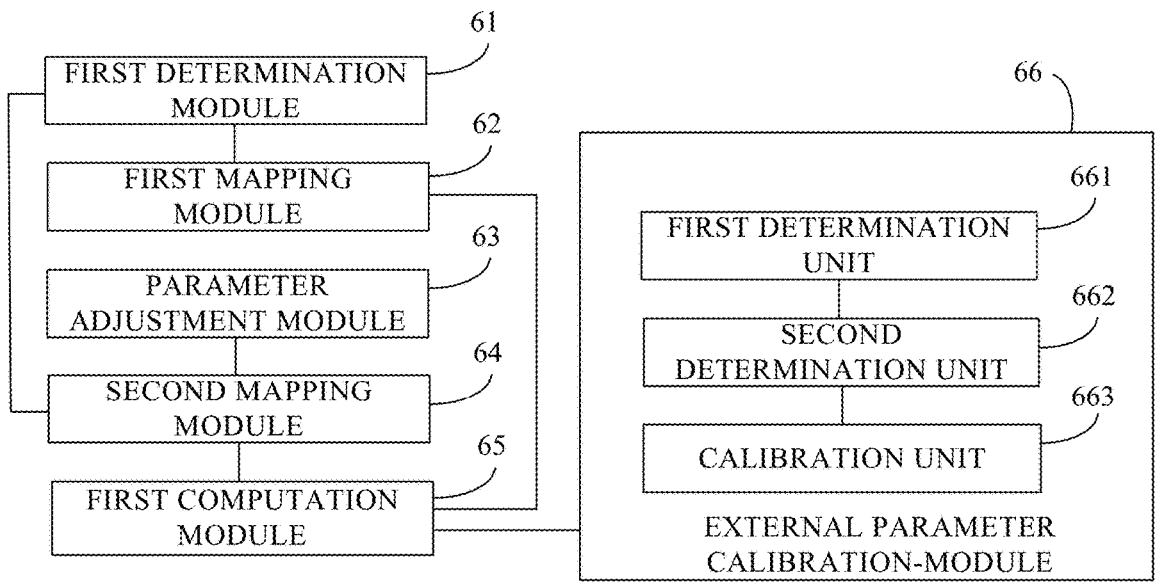
FIG. 7 is a diagram of structures of another example apparatus for camera calibration according to implementations of this disclosure.

FIG. 7 is a diagram of structures of another example apparatus for camera calibration according to implementations of this disclosure. As shown in FIG. 7, on the basis of the implementation as shown in FIG. 6, the external parameter-calibration module 66 includes a first determination unit 661, a second determination unit 662, and a calibration unit 663.

The first determination unit 661 can be configured to determine M differences of the respective M adjustment modes by determining, for any adjustment mode of the M adjustment modes, a difference between a distance corresponding to the adjustment mode in a current iteration and a distance corresponding to the adjustment mode in an immediately previous iteration.

The second determination unit 662 can be configured to determine M ratios of the respective M adjustment modes by determining ratios between the differences of the respective M adjustment modes determined by the first determination unit 661 and the respective step lengths of the respective M adjustment modes.

The calibration unit 663 can be configured to adjust, based on the M ratios and weights corresponding to the respective M adjustment modes, a second group of external parameter values of the second camera in the immediately previous iteration to determine a second group of external parameter values of the second camera in the current iteration.

In an implementation, the M adjustment modes can include adjusting a value of any parameter of the second group of external parameter values used by the second camera by the predetermined step length and keeping values of remaining parameters of the second group of external parameter values unchanged to determine a group of intermediate external parameter values corresponding to the parameter. In another implementation, the M adjustment modes can include adjusting values of parameters having the same physical meanings in the second group of external parameter values used by the second camera by the predetermined step length and keeping values of remaining parameters of the second group of external parameter values unchanged to determine a group of intermediate external parameter values corresponding to the parameters having the same physical meanings. The M adjustment modes can include any combination of any of the aforementioned adjustment modes.

In an implementation, the iteration termination condition can include that a sum of absolute differences between distances corresponding to the respective M adjustment modes in the current iteration and respective distances corresponding to the respective M adjustment modes in the immediately previous iteration is smaller than or equal to a first predetermined threshold value. In another implementation, the iteration termination condition can include that a distance corresponding to each adjustment mode is smaller than or equal to a second predetermined threshold value corresponding to the adjustment mode.

In an implementation, the above-mentioned iteration termination condition can further include: a total number of times of iterations for the second group of external parameter values used by the second camera is greater than or equal to a third predetermined threshold value. The iteration termination condition can include any combination of any of the aforementioned adjustment modes.

In an implementation, the reference mapping plane can be a spherical mapping plane determined based on calibration of a lens of the first camera. In another implementation, the reference mapping plane can be a plane determined by performing a planar mapping in accordance with longitude and latitude to the spherical mapping plane, in which the spherical mapping plane is determined based on the calibration of the lens of the first camera, and the lens of the first camera and a lens of the second camera are of the same type In an implementation, the camera calibration apparatus can further include a second determination module 67, a third determination module 68, and a first record module 69.

The second determination module 67 can be configured to determine multiple first sampling points on the reference mapping plane in accordance with predetermined sampling spacing.

The third determination module 68 can be configured to determine, based on the first group of external parameter values used by the first camera, multiple first pixels corresponding to the multiple first sampling points determined by the second determination module 67 on an imaging plane of the first camera.

The first record module 69 can be configured to store a coordinate-correspondence relationship between the multiple first sampling points determined by the second determination module 67 and the multiple first pixels determined by third determination module 68 in a first mapping table of the first camera.

In an implementation, the camera calibration apparatus can further include a fourth determination module 70, a fifth determination module 71, and a second record module 72.

The fourth determination module 70 can be configured to determine multiple second sampling points on the reference mapping plane in accordance with predetermined sampling spacing.

The fifth determination module 71 can be configured to determine, based on a second group of calibrated external parameter values of the second camera, multiple second pixels corresponding to the multiple second sampling points determined by the fourth determination module 70 on an imaging plane of the second camera.

The second record module 72 can be configured to store a coordinate-correspondence relationship between the multiple second sampling points determined by the fourth determination module 70 and the multiple second pixels determined by the fifth determination module 71 in a second mapping table of the second camera.

Figure 8:
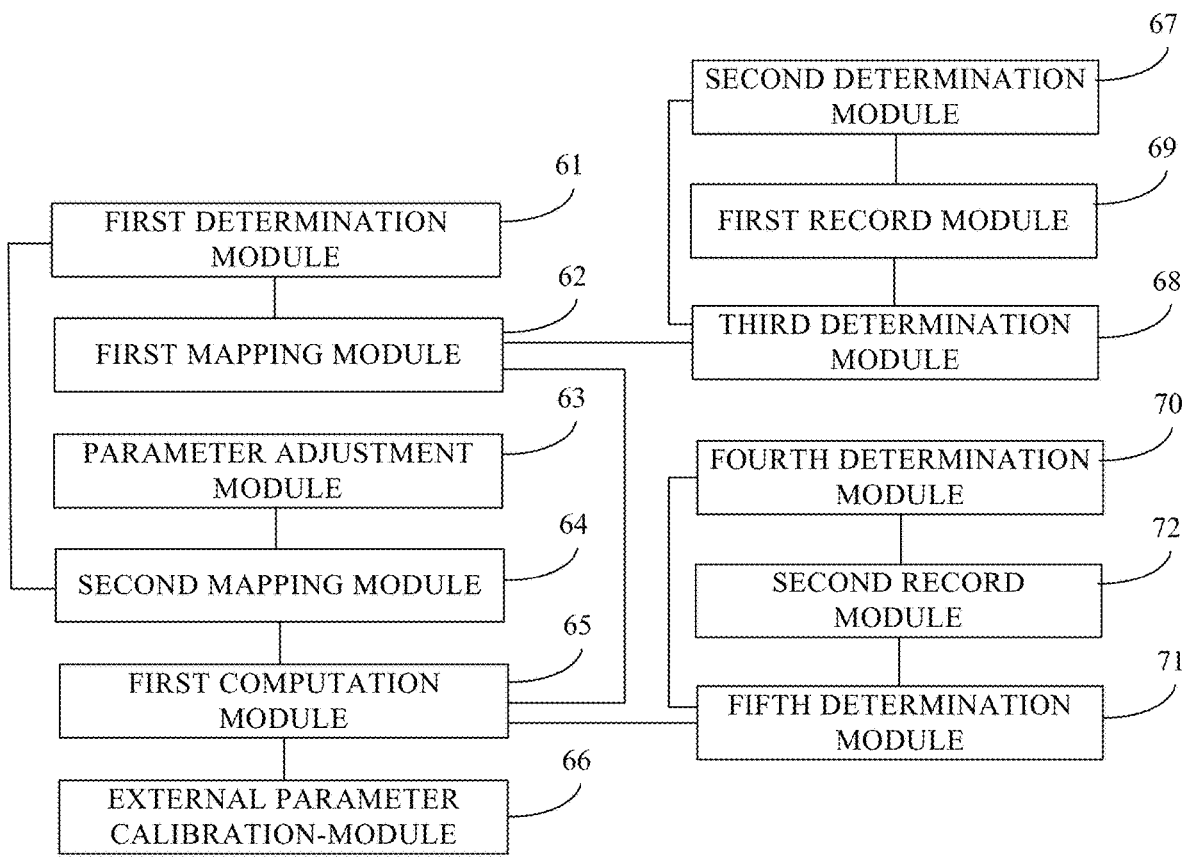
FIG. 8 is a diagram of structures of another example apparatus for camera calibration according to implementations of this disclosure.

FIG. 8 is a diagram of structures of another example apparatus for camera calibration according to implementations of this disclosure. As shown in FIG. 8, on the basis of the implementation as shown in FIG. 6, the camera calibration apparatus further includes the second determination module 67, the third determination module 68, the first record module 69, the fourth determination module 70, the fifth determination module 71, and the second record module 72.

Figure 9:
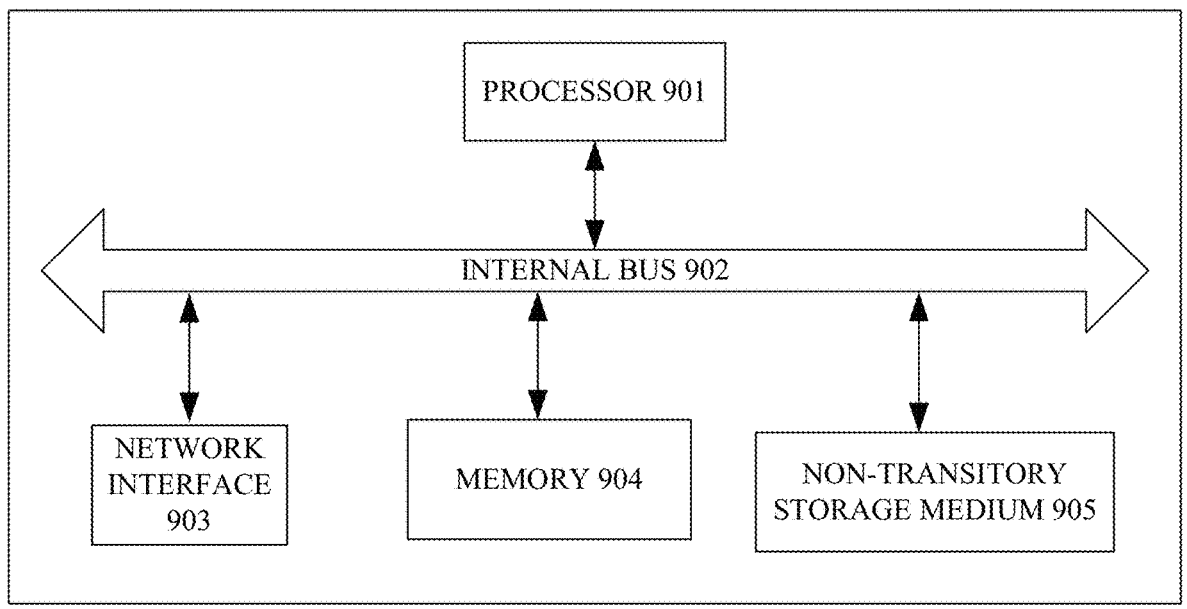
FIG. 9 is a diagram of structures of another example apparatus for camera calibration according to implementations of this disclosure.

FIG. 9 is a diagram of structures of an example electronic apparatus for camera calibration according to implementations of this disclosure. Corresponding to the camera calibration method as shown in FIGS. 2A-4A described above, as shown in FIG. 9, at a hardware level, the electronic apparatus includes a processor 901, an internal bus 902, a network interface 903, a memory 904, and a non-transitory storage medium 905. The electronic apparatus can further include hardware utilized by other services. The processor can read corresponding machine-executable instructions from the non-transitory storage medium 905 into the memory 904 for execution. At a logic level, the camera calibration apparatus described by the implementations as shown in any of FIGS. 6-8 can be formed. In addition to software implementations, this disclosure does not exclude other implementations, such as a logic apparatus or a combination of hardware and software. That is, the execution subject of the above processes is not limited to each logic unit, and can also be hardware or logic apparatuses.

Those skilled in the art will readily recognize other implementations of this disclosure upon consideration of this specification and practice the disclosed examples. This disclosure is intended to cover any variation, use, or adaptation of this disclosure, which follows the general principles of this disclosure and includes common knowledge or conventional techniques not disclosed by this disclosure in this technical field. The description and implementations are purposed for examples only. The true scope and spirit of the disclosure will be indicated by the following claims.

It should also be noted that the terms "include," "including" or any other variations thereof are intended to cover non-exclusive inclusions so that a process, method, article, or apparatus that includes a series of elements includes not only those elements but also other elements that are not explicitly listed, or include elements that are inherent to such processes, methods, goods, or equipment. In the case of no more limitations, the element defined by the sentence "include a . . . " does not exclude the existence of another identical element in the process, method, commodity, or device including the element.

It should be noted that the aforementioned implementations are only examples of this disclosure, not intended to limit this disclosure. Within the spirits and principles of this disclosure, any modification, equivalent replacement, or improvement should fall within the protection scope of this disclosure.

What is claimed is:

1. A method for camera calibration, comprising:
   determining a first feature point set of a first original image captured by a first camera and a second feature point set of a second original image captured by a second camera, wherein the first feature point set corresponds to the second feature point set;
   determining, based on first external parameter values used by the first camera, a first mapping point set by mapping the first feature point set to a reference mapping plane;
   determining, based on M predetermined adjustment modes, M groups of intermediate external parameter values by adjusting second external parameter values used by the second camera, wherein M is an integer greater than or equal to 2, and each of the M predetermined adjustment modes comprises a predetermined step length;

determining, for each adjustment mode of the M predetermined adjustment modes, a second mapping point set corresponding to the adjustment mode by mapping the second feature point set to the reference mapping plane based on a group of intermediate external parameter values, wherein the group of intermediate external parameter values is one of the M groups of intermediate external parameter values and is determined based on the adjustment mode;

determining a distance between the first mapping point set and the second mapping point set as a distance corresponding to the adjustment mode;

adjusting, based on the distance and the predetermined step length, the second external parameter values;

completing calibration of the second external parameter values based on a determination that distances corresponding to the respective M predetermined adjustment modes meet an iteration termination condition; and returning to the determining the M groups of intermediate external parameter values based on a determination that the distances corresponding to the respective M predetermined adjustment modes do not meet the iteration termination condition.

2. The method of claim 1, wherein adjusting, based on the distance and the predetermined step length, the second external parameter values comprises:

determining M differences for the respective M predetermined adjustment modes by determining, for any adjustment mode of the M predetermined adjustment modes, a difference between a distance corresponding to the adjustment mode in a current iteration and a distance corresponding to the adjustment mode in an immediately previous iteration;

determining M ratios for the respective M predetermined adjustment modes by determining ratios between the M differences and the respective predetermined step lengths; and determining the second external parameter values in the current iteration by adjusting the second external parameter values in the immediately previous iteration based on the M ratios and weights corresponding to the respective M predetermined adjustment modes.

3. The method of claim 1, wherein the M predetermined adjustment modes comprise one of:

determining a group of intermediate external parameter values corresponding to a parameter value of the second external parameter values by adjusting the parameter value by the predetermined step length and keeping the remaining second external parameter values unchanged; and determining a group of intermediate external parameter values corresponding to parameter having the same physical meaning in the second external parameter values by adjusting values of the parameters having the same physical meaning by the predetermined step length and keeping the remaining second external parameter values unchanged.

4. The method of claim 1, wherein the iteration termination condition comprises at least one of:

a sum of absolute differences between distances corresponding to the respective M predetermined adjustment modes in a current iteration and respective distances corresponding to the respective M predetermined adjustment modes in an immediately previous iteration is smaller than or equal to a first predetermined threshold value; and a distance corresponding to each adjustment mode of the respective M predetermined adjustment modes is smaller than or equal to a second predetermined threshold value corresponding to the adjustment mode.

5. The method of claim 4, wherein the iteration termination condition further comprises:

a total number of times of iterations for the second external parameter values is greater than or equal to a third predetermined threshold value.

6. The method of claim 1, wherein the reference mapping plane is a spherical mapping plane determined based on calibration of a lens of the first camera; or the reference mapping plane is a plane determined by performing a planar mapping in accordance with longitude and latitude to the spherical mapping plane, wherein the spherical mapping plane is determined based on the calibration of the lens of the first camera, and the lens of the first camera and a lens of the second camera are of the same type.

7. The method of claim 1, further comprising:

determining multiple first sampling points on the reference mapping plane in accordance with predetermined sampling spacing;

determining, on an imaging plane of the first camera, multiple first pixels corresponding to the respective multiple first sampling points based on the first external parameter values; and storing a coordinate-correspondence relationship between the multiple first sampling points and the multiple first pixels in a first mapping table of the first camera.

8. The method of claim 1, further comprising:

determining multiple second sampling points on the reference mapping plane in accordance with predetermined sampling spacing;

determining, on an imaging plane of the second camera, multiple second pixels corresponding to the respective multiple second sampling points based on calibrated second external parameter values; and storing a coordinate-correspondence relationship between the multiple second sampling points and the multiple second pixels in a second mapping table of the second camera.

9. An apparatus for camera calibration, comprising:

a processor; and a memory coupled to the processor, the memory configured to store instructions which when executed by the processor become operational with the processor to:

determine a first feature point set of a first original image captured by a first camera and a second feature point set of a second original image captured by a second camera, wherein the first feature point set corresponds to the second feature point set;

determine, based on first external parameter values used by the first camera, a first mapping point set by mapping the first feature point set to a reference mapping plane;

determine, based on M predetermined adjustment modes, M groups of intermediate external parameter values by adjusting second external parameter values used by the second camera, wherein M is an integer greater than or equal to 2, and each of the M predetermined adjustment modes comprises a predetermined step length;

determine, for each adjustment mode of the M predetermined adjustment modes, a second mapping point set corresponding to the adjustment mode by mapping the second feature point set to the reference mapping plane based on a group of intermediate external parameter values, wherein the group of intermediate external parameter values is one of the M groups of intermediate external parameter values and is determined based on the adjustment mode;

determine a distance between the first mapping point set and the second mapping point set as a distance corresponding to the adjustment mode;

adjust, based on the distance and the predetermined step length, the second external parameter values;

complete calibration of the second external parameter values based on a determination that distances corresponding to the respective M predetermined adjustment modes meet an iteration termination condition; and return to determine the M groups of intermediate external parameter values based on a determination that the distances corresponding to the respective M predetermined adjustment modes do not meet the iteration termination condition.

10. The apparatus of claim 9, wherein the memory comprising the instructions operational with the processor to adjust the second external parameter values further comprises instructions which when executed by the processor become operational with the processor to:

determine M differences for the respective M predetermined adjustment modes by determining, for any adjustment mode of the M predetermined adjustment modes, a difference between a distance corresponding to the adjustment mode in a current iteration and a distance corresponding to the adjustment mode in an immediately previous iteration;

determine M ratios for the respective M predetermined adjustment modes by determining ratios between the M differences and the respective predetermined step lengths; and determine the second external parameter values in the current iteration by adjusting the second external parameter values in the immediately previous iteration based on the M ratios and weights corresponding to the respective M predetermined adjustment modes.

11. The apparatus of claim 9, wherein the M predetermined adjustment modes comprise one of:

determining a group of intermediate external parameter values corresponding to a parameter value of the second external parameter values by adjusting the parameter value by the predetermined step length and keeping the remaining second external parameter values unchanged; and determining a group of intermediate external parameter values corresponding to parameter having the same physical meaning in the second external parameter values by adjusting values of the parameters having the same physical meaning by the predetermined step length and keeping the remaining second external parameter values unchanged.

12. The apparatus of claim 9, wherein the iteration termination condition comprises at least one of:

a sum of absolute differences between distances corresponding to the respective M predetermined adjustment modes in a current iteration and respective distances corresponding to the respective M predetermined adjustment modes in an immediately previous iteration is smaller than or equal to a first predetermined threshold value; and a distance corresponding to each adjustment mode of the respective M predetermined adjustment modes is smaller than or equal to a second predetermined threshold value corresponding to the adjustment mode.

13. The apparatus of claim 12, wherein the iteration termination condition further comprises:

a total number of times of iterations for the second external parameter values is greater than or equal to a third predetermined threshold value.

14. The apparatus of claim 9, wherein the reference mapping plane is a spherical mapping plane determined based on calibration of a lens of the first camera; or the reference mapping plane is a plane determined by performing a planar mapping in accordance with longitude and latitude to the spherical mapping plane, wherein the spherical mapping plane is determined based on the calibration of the lens of the first camera, and the lens of the first camera and a lens of the second camera are of the same type.

15. The apparatus of claim 9, wherein the memory further comprises instructions which when executed by the processor become operational with the processor to:

determine multiple first sampling points on the reference mapping plane in accordance with predetermined sampling spacing;

determine, on an imaging plane of the first camera, multiple first pixels corresponding to the respective multiple first sampling points based on the first external parameter values; and store a coordinate-correspondence relationship between the multiple first sampling points and the multiple first pixels in a first mapping table of the first camera.

16. The apparatus of claim 9, wherein the memory further comprises instructions which when executed by the processor become operational with the processor to:

determine multiple second sampling points on the reference mapping plane in accordance with predetermined sampling spacing;

determine, on an imaging plane of the second camera, multiple second pixels corresponding to the respective multiple second sampling points based on calibrated second external parameter values; and store a coordinate-correspondence relationship between the multiple second sampling points and the multiple second pixels in a second mapping table of the second camera.

17. An electronic apparatus, comprising:

a first determination module, configured to determine a first feature point set of a first original image captured by a first camera and a second feature point set of a second original image captured by a second camera, wherein the first feature point set corresponds to the second feature point set;

a first mapping module, configured to determine, based on first external parameter values used by the first camera, a first mapping point set by mapping the first feature point set to a reference mapping plane;

a parameter adjustment module, configured to determine, based on M predetermined adjustment modes, M groups of intermediate external parameter values by adjusting second external parameter values used by the second camera, wherein M is an integer greater than or equal to 2, and each of the M predetermined adjustment modes comprises a predetermined step length;

a second mapping module, configured to determine, for each adjustment mode of the M predetermined adjustment modes, a second mapping point set corresponding to the adjustment mode by mapping the second feature point set to the reference mapping plane based on a group of intermediate external parameter values, wherein the group of intermediate external parameter values is one of the M groups of intermediate external parameter values and is determined based on the adjustment mode;

a first computation module, configured to determine a distance between the first mapping point set and the second mapping point set as a distance corresponding to the adjustment mode; and an external parameter-calibration module, configured to:
adjust, based on the distance and the predetermined step length, the second external parameter values;
complete calibration of the second external parameter values based on a determination that distances corresponding to the respective M predetermined adjustment modes meet an iteration termination condition; and
iterate, by the parameter adjustment module, to determine the M groups of intermediate external parameter values based on a determination that the distances corresponding to the respective M predetermined adjustment modes do not meet the iteration termination condition.

18. The electronic apparatus of claim 17, wherein the external parameter-calibration module comprises:
a first determination unit, configured to determine M differences for the respective M predetermined adjustment modes by determining, for any adjustment mode of the M predetermined adjustment modes, a difference between a distance corresponding to the adjustment mode in a current iteration and a distance corresponding to the adjustment mode in an immediately previous iteration;
a second determination unit, configured to determine M ratios for the respective M predetermined adjustment modes by determining ratios between the M differences and the respective predetermined step lengths; and
a calibration unit, configured to determine the second external parameter values in the current iteration by adjusting the second external parameter values in the immediately previous iteration based on the M ratios and weights corresponding to the respective M predetermined adjustment modes.

19. The electronic apparatus of claim 17, further comprising:
a second determination module, configured to determine multiple first sampling points on the reference mapping plane in accordance with predetermined sampling spacing;
a third determination module, configured to determine, based on the first external parameter values, multiple first pixels corresponding to the multiple first sampling points on an imaging plane of the first camera; and
a first record module, configured to store a coordinate-correspondence relationship between the multiple first sampling points and the multiple first pixels in a first mapping table of the first camera.

20. The electronic apparatus of claim 17, further comprising:
a fourth determination module, configured to determine multiple second sampling points on the reference mapping plane in accordance with predetermined sampling spacing;
a fifth determination module, configured to determine, based on second calibrated external parameter values, multiple second pixels corresponding to the multiple second sampling points on an imaging plane of the second camera; and
a second record module, configured to store a coordinate-correspondence relationship between the multiple second sampling points and the multiple second pixels in a second mapping table of the second camera.

* * * * *